Nov. 9, 1965  B. A. LOOMANS  3,216,706

CONTINUOUS MIXING MACHINE

Filed Aug. 21, 1963  8 Sheets-Sheet 1

INVENTOR.
BERNARD A. LOOMANS

BY Learman, Learman & McCulloch

ATTORNEYS

Nov. 9, 1965   B. A. LOOMANS   3,216,706
CONTINUOUS MIXING MACHINE
Filed Aug. 21, 1963   8 Sheets-Sheet 2
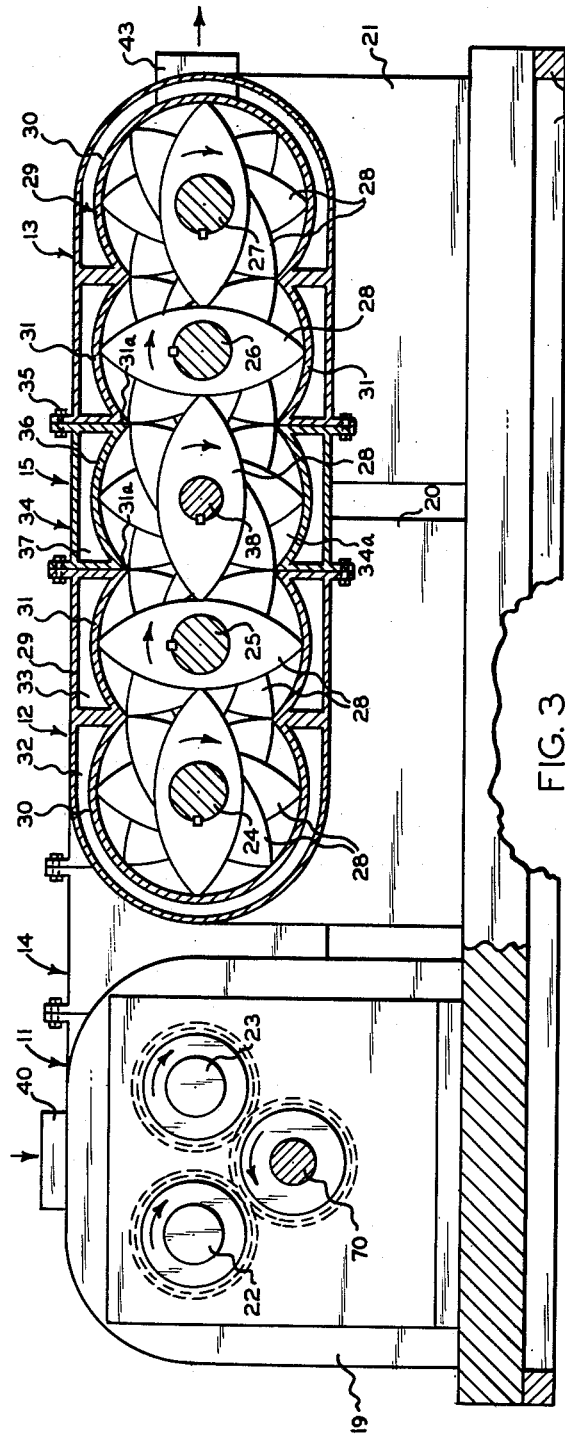
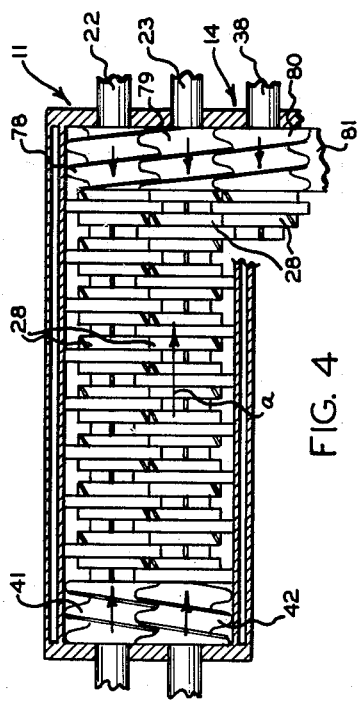
INVENTOR.
BERNARD A. LOOMANS
BY Learman, Learman & McCulloch
ATTORNEYS

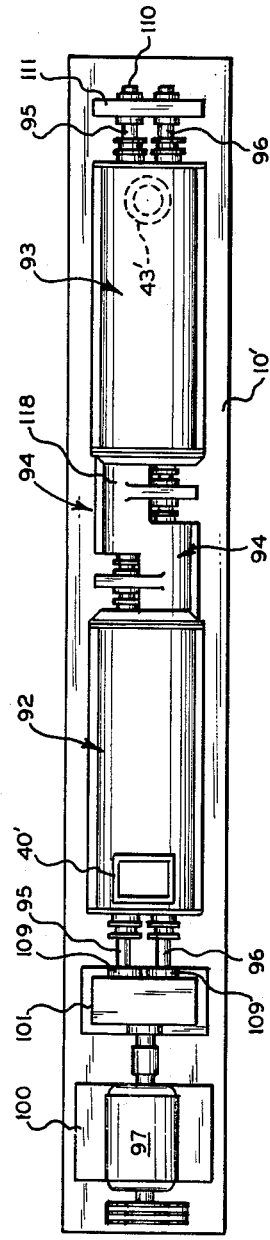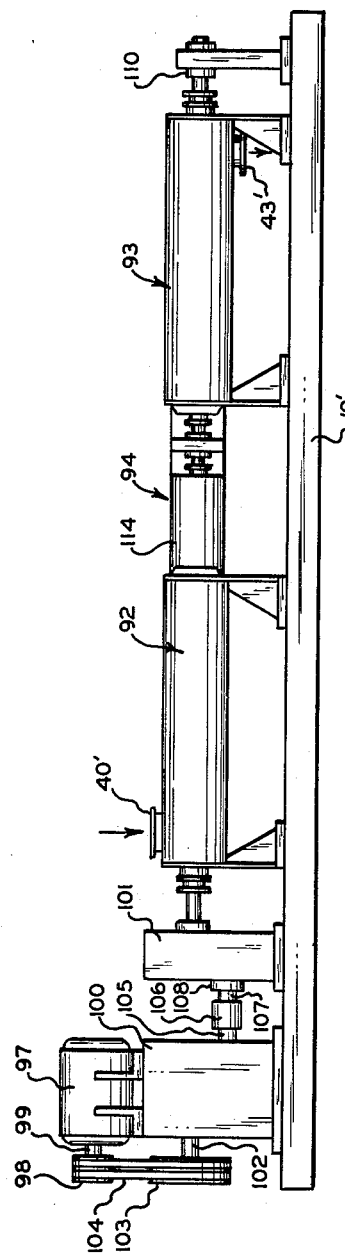

Nov. 9, 1965  B. A. LOOMANS  3,216,706
CONTINUOUS MIXING MACHINE
Filed Aug. 21, 1963  8 Sheets-Sheet 5

INVENTOR.
BERNARD A. LOOMANS
BY Learman, Learman & McCulloch
ATTORNEYS

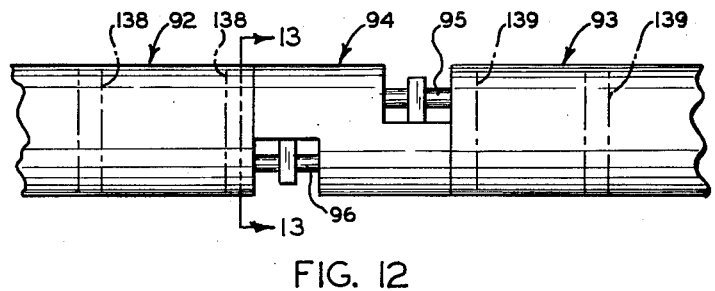
FIG. 12
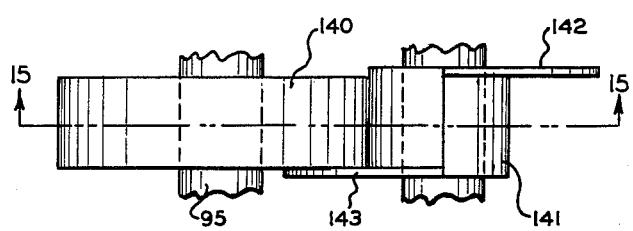
FIG. 14
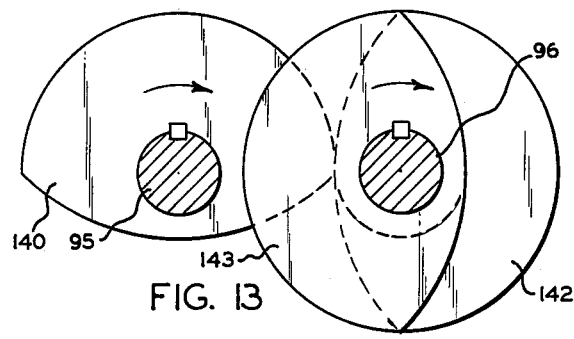
FIG. 13
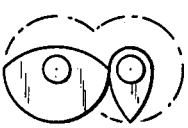
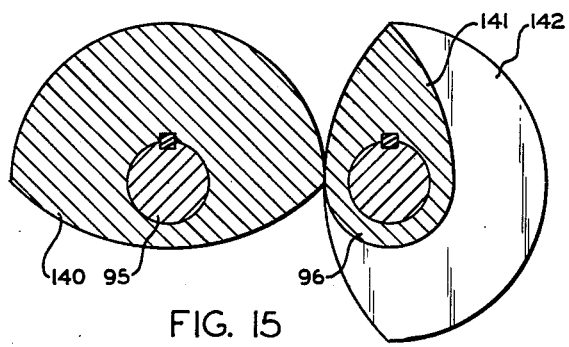
FIG. 15
FIG. 16

INVENTOR.
BERNARD A. LOOMANS

Nov. 9, 1965   B. A. LOOMANS   3,216,706
CONTINUOUS MIXING MACHINE
Filed Aug. 21, 1963   8 Sheets-Sheet 8
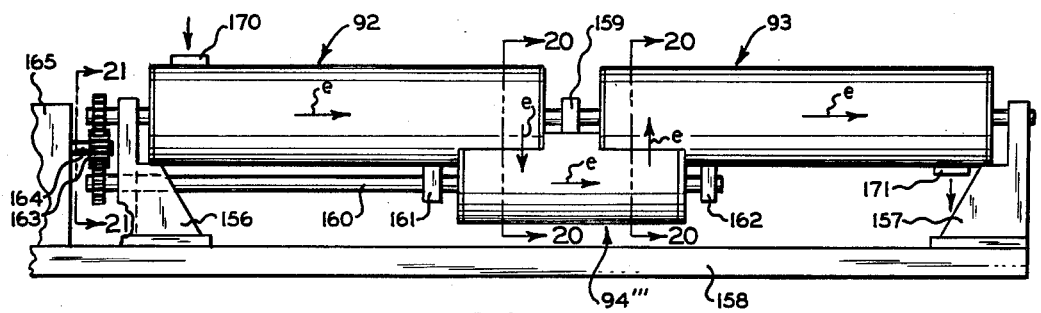
FIG. 19
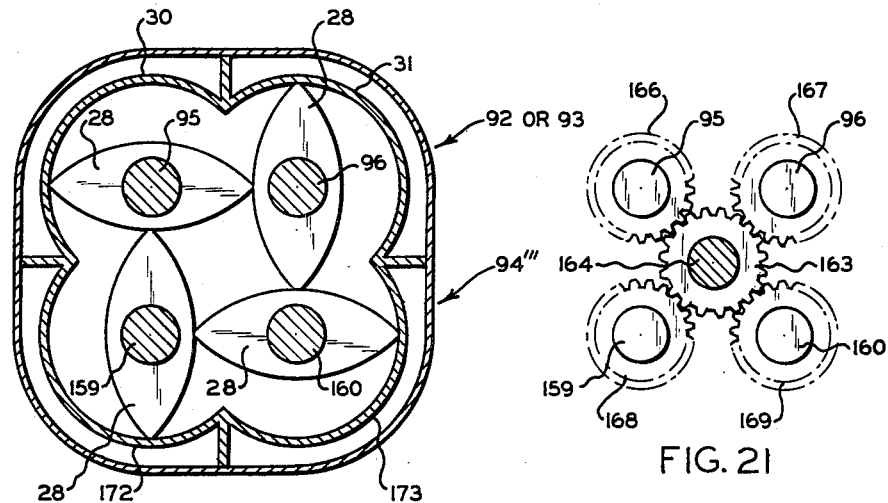
FIG. 20
FIG. 21
INVENTOR.
BERNARD A. LOOMANS
BY Learman, Learman & McCulloch
ATTORNEYS United States Patent Office 3,216,706
Patented Nov. 9, 1965

3,216,706
CONTINUOUS MIXING MACHINE
Bernard A. Loomans, Saginaw, Mich., assignor to Baker Perkins Inc., Saginaw, Mich., a corporation of New York
Filed Aug. 21, 1963, Ser. No. 303,564
20 Claims. (Cl. 259—10)

This invention relates to continuous mixers for intimately mixing, reacting, blending, and/or kneading a wide variety of materials, including those in a plastic, liquid, granular or powdered state, and more particularly to continuous mixers of this character which, for various reasons, require for certain mixing operations that the material remain in the mixer for a comparatively long period of time in a continuous state of agitation. Single long mixing vessels could be provided for such materials but the shafts which would have to be used in such vessels would be subject to deflection because they would be extremely long and could be supported only at their ends.

One of the prime objects of the present invention is to design continuous mixing apparatus in which two or more mixing casings or vessels are connected by a transfer casing or the like having mixing members provided therein as well as in the vessels connected, so that a continuous agitation of the material, necessary for certain chemical reactions to take place and very desirable in many blending and kneading operations, is maintained throughout the mixing operation. With the length of any individual vessel or casing thus maintained below a certain maximum length, the problem of shaft deflection is overcome and this is of prime importance inasmuch as the substantially interengaging paddles used in this type of mixer not only must wipe one another but also the casing interior walls.

A further object of the invention is to provide continuous mixer apparatus of the character described in which bearing loads are appreciably reduced, it being understood that the mixing elements which are used, and many of the ingredients which are mixed, require shafts of large diameter to resist the torsional and bending stresses that must be imposed to rotate the kneading and mixing elements, since the machine may be called upon to knead and mix dense plastic or dry materials, for instance.

A further object of the invention is to provide continuous mixing apparatus of this character in which close clearances can be maintained between the agitator blades and the vessel walls.

Briefly, the invention is concerned with the provision of transfer casings between a plurality of vessel sections. In one form of the invention the casings are arranged in side-by-side relation and paddle members mounted within the transfer section are in substantially interengaging relation with both paddles in the vessel from which the material is received and paddles in the vessel which receives the material from the transfer section. In another embodiment of the invention the transfer section extends between two axially aligned vessels and comprises a section shaped to permit bearings to support the common mixer shafts for both vessels intermediate their ends at the transfer section.

A further object of the invention is to provide various improved transfer sections and substantially interengaging paddle elements which may be used with various materials.

Other objects and advantages of the invention will be pointed out specifically or will become apparent from the following description when it is considered in conjunction with the appended claims and the accompanying drawings, in which:

FIGURE 3 is an enlarged, sectional, transverse elevational view taken on the line 3—3 of FIGURE 1;

FIGURE 4 is a fragmentary, sectional, top plan view illustrating a modified form of the invention;

FIGURE 7 is a top plan view of another embodiment of the invention in which the mixing vessels are axially aligned;

FIGURE 8 is a side elevational view thereof;

FIGURE 12 is a fragmentary top plan view of another form of the invention which is similar to the embodiment of FIGURES 7 and 8;

FIGURE 13 is a sectional, transverse, elevational view on an enlarged scale, taken on the line 13—13 of FIGURE 12;

FIGURE 14 is a top plan view thereof;

FIGURE 15 is a sectional, side elevational view taken on the line 15—15 of FIGURE 14;

FIGURE 16 is a side elevational view progressively illustrating various angular positions of the paddle members shown in FIGURES 13–15;

FIGURE 19 is a side elevational view illustrating still another form of transfer section for connecting axially aligned mixing vessels;

FIGURE 20 is an enlarged, sectional, transverse elevational view taken on either of the lines 20—20 of FIGURE 19; and FIGURE 21 is a sectional, transverse elevational view taken on the line 21—21 of FIGURE 19 and showing only the drive elements for the various mixer shafts.

Figures 1, 2:
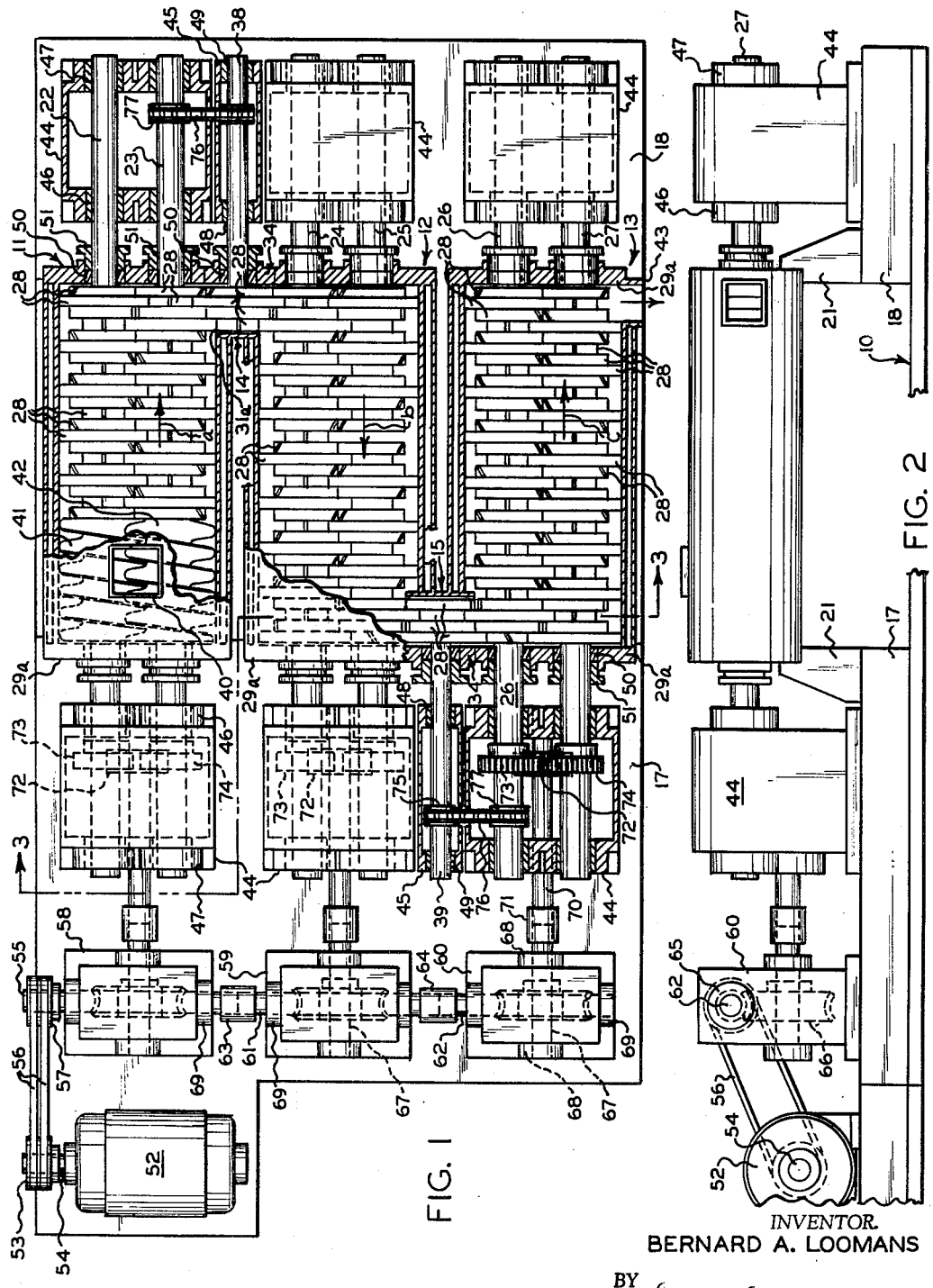
FIGURE 1 is a top plan view of a continuous mixing machine constructed in accordance with the invention, with the top wall of one of the mixing vessels, and portions of the top walls of the other mixing vessels, broken away in the interests of clarity.
FIGURE 2 is a side elevational view of the machine.

Referring now more particularly to the accompanying drawings, and in the first instance to FIGURES 1–3 thereof, wherein a presently preferred form of the invention is shown, a base generally designated 10 is provided for supporting a trio of side-by-side mixing vessels generally identified by the numerals 11, 12 and 13. These mixing vessels 11, 12 and 13 are of the general character disclosed in the instant assignee's copending United States application Serial No. 181,278, filed March 21, 1962, by Bernard A. Loomans and Ambrose K. Brennan, Jr., and entitled Continuous Mixer, now Patent No. 3,195,868, except that, with the mixers 11, 12 and 13 disposed in side-by-side, parallel relationship and connected by transfer sections generally designated 14 and 15, a continuous mixing path of far greater length is obtained. While the base 10 may take any desired form, it is shown as comprising peripheral footing sections 16 on which a pair of longitudinally spaced apart platforms 17 and 18 are mounted. Fixed on the platforms 17 and 18 are pairs of longitudinally opposed mounting blocks 19, 20 and 21 for supporting the weight of the vessels 11, 12 and 13.

As shown particularly in FIGURE 3, a pair of shafts 22–23, 24–25, and 26–27 extend through each of the vessels 11, 12 and 13, respectively, and mounted on these shafts are generally lenticular, substantially radially interengaging mixing and agitating paddle members 28 which may be fixed by means of keys or the like in helical progression on the pairs of shafts 22–23, 24–25, and 26–27. The paddles 28 on the respective pairs of shafts 22–23, 24–25, and 26–27 are disposed 90° out of phase, as shown in FIGURE 3, and may themselves be either straight or formed on a helix, as desired. In any event, the paddles are preferably progressively angularly displaced on the shafts 22, 23, 24, 25, 26 and 27, in the manner indicated in FIGURE 3. It will be seen that the various substantially interengaging paddle members 28 are in continuous wiping engagement with one another and it is to be noted that they are also in wiping engagement with the interior walls of the stationary barrels generally designated 29 in which they revolve. End walls 29a are provided for the barrels 29 of each of the vessels 11, 12, and 13. Each barrel 29 includes communicating, side-by-side intersecting, semicylindrical interior chamber walls 30 and 31 with the cylindrical chamber walls 30 and 31 being open at their intersecting sides, as shown, and each wall 31 being open at its opposite side at the front end thereof as at 31a. Provided in each barrel section 29 are communicating chambers 32 and 33 for holding a preferably continuously circulating cooling or heating medium.

As shown in FIGURE 3, the transfer section 15 includes a barrel generally designated 34 which is bolted as at 35 between the barrels 29 of the mixing vessels 12 and 13, the transfer section 15 including a semicylindrical chamber wall 36, open at both sides, connecting with the chamber walls 31 of the barrel sections 29, as shown, and there being a jacket 37 provided in the barrel section 34 which also may be supplied with a cooling or heating medium, dependent on the particular mixing operation which is to be performed. End walls 34a are provided for the barrel 34. It is to be understood that the barrel 29 of the mixing vessel 11 is identical in construction with the barrel 29 of the mixing vessel 12 and that the barrel 34 of the transfer unit 14 is identical in construction with the barrel 34 of the transfer section 15. It will be seen that each of the transfer units 14 and 15 supports a single shaft 38 and 39, respectively, on which identical lenticular paddles 28 are fixed in progressively helical arrangement in substantially interengaging mating relation with the paddles 28 on the neighboring shafts 23–24 or 25–26 as the case may be and 90° out of phase therewith.

Provided in the barrel 29 of the mixer vessel 11 near one end thereof is a material supply chute or duct 40 which leads through the barrel 29 to the interior of the chamber defined by walls 30 and 31. It will be seen that the substantially interengaging paddle members 28 are not provided throughout the length of the mixing vessel 11. As shown in FIGURE 1, the paddles 28 are arranged spirally and pitched in a direction to move the material acted upon along the vessels 11, 12 and 13 in the direction of arrows a, b and c. Fixed on the front ends of the shafts 22 and 23 in the mixer vessel 11 are continuous helical advancing screw portions 41 and 42 which are also provided in substantially interengaging relation and in cross-section have the same configuration as the paddles 28, the feed screws 41 and 42 being pitched in a direction to advance material fed in through the chute 40 in the direction of the arrow a. In mixing some materials, it is desirable to amplify the advancing action of the paddles 28 and this is what is accomplished with the substitution of the substantially interengaging spiral feed screw portions 41 and 42. Provided in the end of the mixer vessel 13 supported by platform 18 is a discharge duct 43 which preferably extends laterally through the barrel 29 to communicate with the interior of the chamber wall 30 of the vessel 13.

It will be seen that bearing blocks 44 are provided for each pair of shafts 22–23, 24–25, and 26–27 at the opposite ends thereof and that bearing blocks 45 are also provided to support the shafts 38 and 39 of the transfer section assemblies 14 and 15. Axially spaced apart bearings 46 and 47 are provided in the bearing blocks 44 for supporting the pairs of shafts 22–23, 24–25, and 26–27, and similar spaced apart bearings 48 and 49 are provided in the bearing blocks 45 for supporting the shafts 38 and 39. In order to prevent leakage of material from the vessels around the shafts 22, 23, 24, 25, 26, 27, 38 and 39, packing glands 50 are provided in the end walls 29a of the various vessels 11, 12 and 13 and the end walls 34a of the barrels 34 of the transfer units 14 and 15, as shown in FIGURE 1, and, as noted, these packing glands 50 may be held in position by retainer members 51.

Mounted on the platform 17 to drive the various mixer shafts is a motor 52 which mounts a pulley 53 on its armature shaft 54 so that it can drive a shaft 55 by means of belts 56 which are trained around the pulley 53 and also around a pulley 57 provided on the shaft 55. It will be seen that gear boxes 58, 59 and 60 are mounted on the platform 17 in longitudinal alignment with the vessels 11, 12 and 13 and that the gear boxes 58, 59 and 60 journal drive shafts 55, 61 and 62, the shaft 61 being coupled to the shaft 55 at 63, and the shaft 62 being coupled to the shaft 61 at 64. Each of the shafts 55, 61 and 62 mounts a worm gear 65 which is in mesh with a worm wheel 66 provided on a shaft 67 which extends transversely through each of the gear boxes 58, 59 and 60. Bearings 68 are provided for journaling each of the shafts 67 and bearings 69 are provided on the various gear boxes for journaling the shafts 55, 61 and 62. The shafts 67 are arranged to drive shafts 70, to which they are coupled as at 71, and it will be seen that each of the shafts 70 is mounted by one of the bearing blocks 44 and mounts a drive gear 72 which meshes with the gears 73 and 74 provided on the pairs of shafts 22–23, 24–25, and 26–27.

The shafts 38 and 39 are driven from a neighboring mixing vessel shaft, the shafts 38 and 39 each mounting a sprocket 75, for instance, around which a chain 76 is trained which also is trained around a sprocket 77 on a neighboring shaft. In the case of shaft 38, the sprocket 77 is fixed on the shaft 23 and in the case of shaft 39 the sprocket 77 is fixed on the shaft 26.

In the operation of the mixing machine, material is fed continuously through the chute 40 into the mixing chamber of vessel 11 and is advanced forwardly in the direction a by the substantially interengaging screw sections 41–42 and by the substantially interengaging paddles 28 on their respective shafts 22 and 23. The paddles 28 on shafts 22 and 23 are rotated in the same direction and at the same speed and while continuously agitating the material will wipe clean the walls 30 and 31 of their respective chambers. Also, the flanks of each paddle 28 are wiped clean by the tip of a mating paddle on the other shaft and as a result there is no accumulation of material on the walls of the chambers nor on the flanks of the rotor paddles, and the apparatus is self-cleaning and accomplishes efficient and homogeneous mixing. When the material reaches the end of the vessel 11 it is transferred laterally or transversely through the transfer section 14 to the mixing vessel 11 and proceeds therein in the direction of arrow b. The shaft 38 is rotated in the same direction and at the same speed as shafts 22 and 23 and the paddles 28 thereon are substantially in interengaging relationship with paddles 28 on both shafts 23 and 24. The shafts 24 and 25 rotate in the same direction and at the same speed as shafts 22, 23, and 38 and are pitched to advance the material in the direction b. The mixing is identical in the vessel 12 and the material proceeds to the transfer section 15 and thence to the vessel 13. The paddles 28 on shafts 26 and 27 are pitched to continuously advance the material in the vessel 13 to the discharge chute 43. The paddles 28 on the shaft 39, which is driven in the same direction and at the same speed as the previously mentioned shafts, are similarly substantially in interengaging relation with the paddles 28 on the adjoining shafts 25 and 26. Thus, in both the transfer sections 14 and 15 the paddles 28 are wiped clean, as are also the walls of the mixing chambers in the barrels 34. The mixing action is identical in the vessel 13, where the shafts 26 and 27 revolve in the same direction and at the same speed as the previously mentioned mixing shafts.

In this mixing machine there is some backward squeezing of the material from one set of mating paddles into the zone of action of a rearwardly adjoining pair of paddles, as well as a forward squeezing of the material into the zone of action of a forwardly adjoining pair of paddles, and this effects a shearing and/or stretching action on the material and results in more intimate and effective mixing and kneading, as described in detail in the copending application identified. While a portion of the stated material is squeezed backward the resultant direction of movement of the material will be in a forward direction, aided and abetted by the direction of displacement of the paddles 28, the helix angle thereof, and the screw sections 41 and 42.

In FIGURE 4 I have shown a modified embodiment of the invention in which similar parts are identified by the same numerals. For instance, the vessel is generally identified at 11 and includes the axially extending shafts 22 and 23 on which substantially interengaging paddle members 28 are fixed, as before, in the same relationship. The shafts 22 and 23 may also mount the advancing screw sections 41 and 42. Transfer casing 14 similarly mounts the shaft 38 and the paddles 28 thereon are in substantially interengaging relationship with the paddles 28 on the shaft 23, as before. Instead of providing packing gland members 50, intermeshing screw sections 78, 79 and 80 are mounted on the shafts 22, 23 and 38, respectively, and these screw sections are of the same cross-sectional configuration as the screw sections 41 and 42, except that they are pitched reversely. Thus, material traveling axially in the direction $a$ will be continuously returned to the end paddle members 28 by the screw sections 78 and 79, and similarly the screw section 80 will operate to return material to the paddles 28 mounted on the shaft 38. Similar substantially interengaging screw sections may be mounted at both ends of the vessels 12 and 13 and in transfer section 15 on the pairs of shafts 24–25 and 26–27, and on the shaft 39. The screw section 81 for the shaft 24 shown in FIGURE 4 then operates as a forwarding screw section, but of course also accomplishes the same function as the screw sections 78, 79 and 80 in sealing the end wall of the vessel 11 and transfer section 14 to prevent leakage along the mixer shafts.

Figure 6:
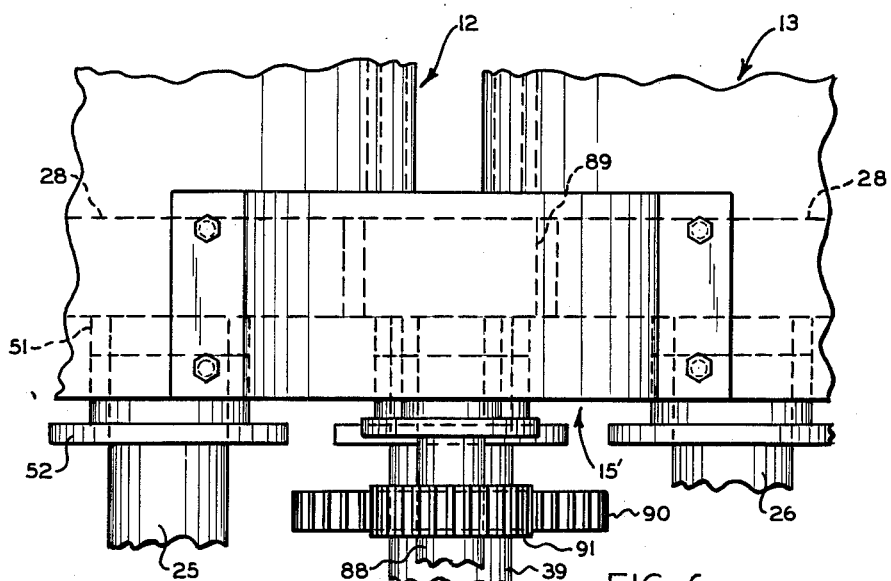
FIGURE 6 is a fragmentary, top plan view thereof.
Figure 5:
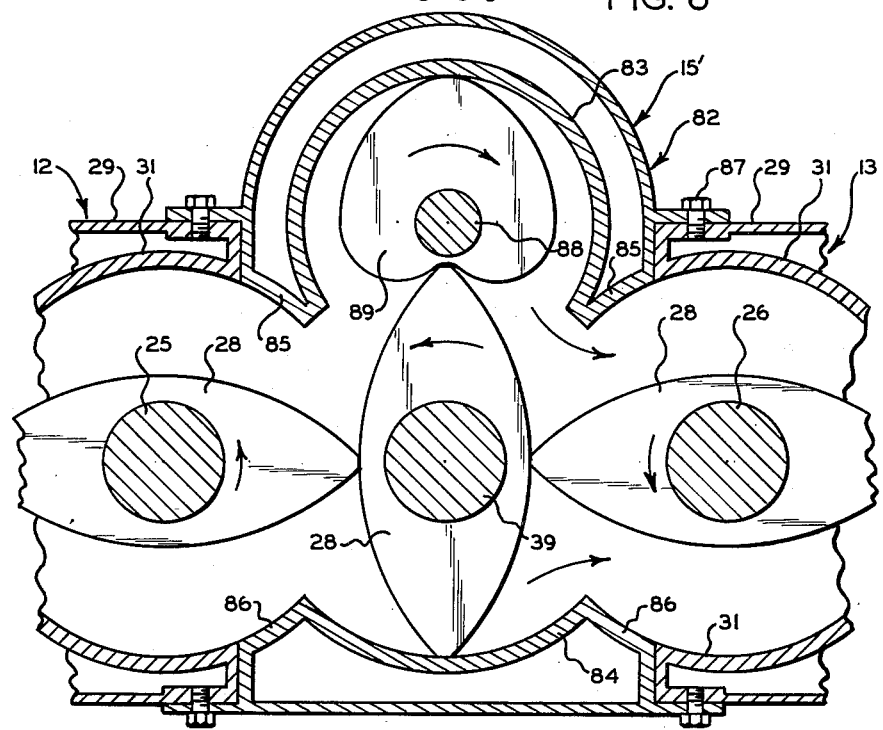
FIGURE 5 is an enlarged, sectional, transverse elevational view through the transfer casing of still another modified form of the invention in which back flow of the material in the transfer casing is positively prevented.

In the embodiment of the invention disclosed in FIGURES 5 and 6, the construction of the vessels 12 and 13 is identical to that previously disclosed and includes the barrel sections 29 with the inner chamber walls 30 and 31. The transfer sections are quite different although each mounts one or more paddles 28, as previously, on its shaft 38–39. As shown in FIGURE 5 particularly, the transfer section generally designated 15', which corresponds to the former transfer section 15, includes a barrel generally designated 82 with an upper curvilinear chamber wall 83 and a lower curvilinear chamber wall 84. Extending from the upper wall 83 and lower wall 84 are curvilinear lateral walls 85 and 86, respectively, which merge with the chamber walls 31, and it will be noted that the barrel 82 is bolted between the vessels 12 and 13 by bolt members 87 or the like. The paddle members 28 on the shaft 39 have substantially interengaging relation with the member or members 28 on the shafts 25 and 26, as previously.

Above the shaft 39 in axially parallel relationship therewith is a shaft 88 on which is mounted a rotor 89 which is revolved in the opposite direction to the shaft 39 and at twice the rate of speed thereof. One or more rotor members 89 may be keyed to the shaft 88, dependent on whether one or more paddles 28 are provided on the shaft 39. The shaft 88 may be driven from a gear 90 on the shaft 39 which is in mesh with a smaller gear 91 on the shaft 88, it being understood that the shaft 39 is driven in the same manner as previously from the shaft 26. Packing glands 51 and gland retainers 52 are provided for the shafts 25, 26 and 39 as before and may also be provided for the shaft 88. The function of the rotor paddle 89 is to prevent flow back of the material at the top of the barrel 82. Normally, with interengaging mixers 28 there would be a certain amount of flow back from the transfer unit 15 to the vessel 12, with the paddle 28 on shaft 39 traveling in the counterclockwise direction indicated at the upper end of the chamber. While this is desirable in many mixing operations to achieve a thorough blend of the materials, in some mixing operations where a chemical reaction is involved it is desired that all of the reacting material remain in the continuous mixing apparatus for approximately an equal period of time. To aid in achieving this object, the rotor 89 prevents flow back as indicated and in this sense comprises a rotary seal as well as an agitator. It will be noted that the paddle 28 on shaft 39 is wiped by the adjoining paddles 28 on shafts 25 and 26 and itself wipes the rotor 89. The paddle 28 on shaft 39 also wipes the chamber wall 84 and the rotor 89 wipes the wall 83. While the construction has been illustrated only as a substitute for the transfer unit 15 between the vessels 12 and 13, it is to be understood that it would also be substituted for the transfer unit 14 between the vessels 11 and 12.

In FIGURES 7–10 I have shown still another embodiment of the invention in which a pair of mixing vessels 92 and 93 are mounted in tandem on a base 10'. The vessel 92, which may be substantially identical in construction with the vessel 11, is connected with the vessel 93, which may be substantially identical in construction with the vessel 13, by a generally Z-shaped transfer section generally designated 94. In this embodiment of the invention a pair of continuous shafts 95 and 96 extend through the initial mixing vessel 92, transfer vessel 94, and mixing vessel 93. A material supply duct 40' is provided in vessel 92 and a discharge chute 43' in vessel 93.

An electric motor 97 having a pulley 98 mounted on its armature shaft 99 may be employed to drive the shafts 95 and 96 through a gear box 100. A gear housing 101 is also provided in longitudinal alignment with the box 100. Journaled in the gear box 100 is a shaft 102 which mounts a pulley 103 around which drive belts 104, which are also trained around the pulley 98, are trained. The gear box output shaft 105 is coupled as at 106 to a shaft 107 journaled by a bearing 108 on the bearing block 101 and, as before, the shaft 107 mounts a gear (not shown) which is in mesh with gears (not shown) mounted on the shafts 95 and 96. Bearings 109 on the bearing block 101 support the shafts 95 and 96. Similarly bearings 110 on a bearing block 111 at the opposite end of the continuous mixing apparatus support the opposite ends of the shafts 95 and 96.

Figure 9:
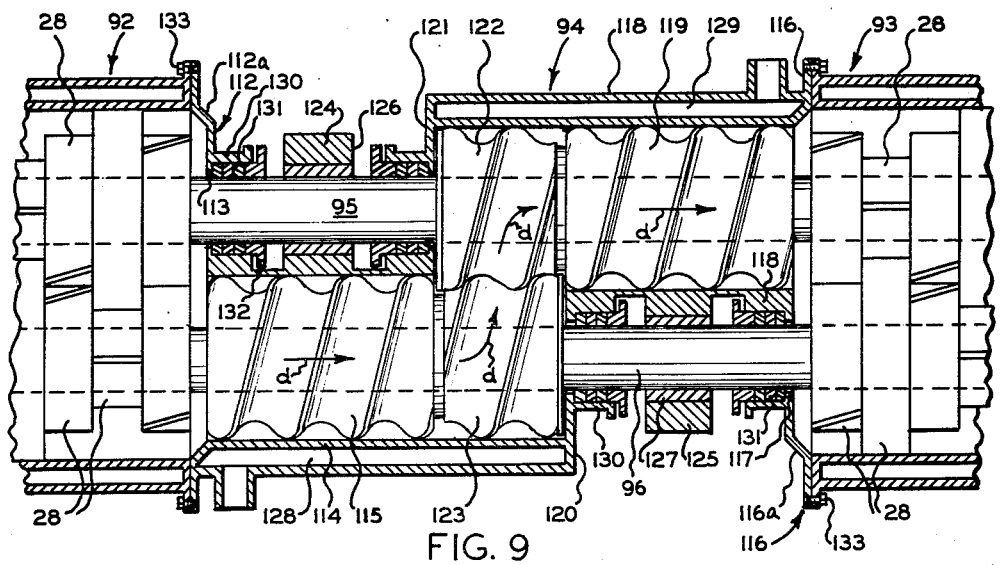
FIGURE 9 is an enlarged, sectional plan view taken through the transfer section connecting the vessels in FIGURES 7 and 8.

For the sake of convenience, it will be assumed that the vessel 92 is of substantially the same construction as the vessel 11, except that its barrel has no end wall adjoining the transfer section 94, and it will also be assumed that the vessel 93 is of the same construction as the vessel 13, except that its barrel likewise has no end wall adjoining the transfer section 94. Identical substantially interengaging paddle members 28 accordingly are provided on the shafts 95 and 96 within the vessels 92 and 93. As shown particularly in FIGURE 9, the transfer mixing section or vessel 94 includes an end wall 112 having an opening 113 for passing the shaft 95, and a projecting barrel section 114 which accommodates the shaft 96 and the screw section 115, which is fixed thereon and wipes the interior walls of the cylindrical barrel section 114. Likewise, the opposite end wall 116 of the transfer vessel 94 includes an opening 117 passing the shaft 96 and a projecting barrel section 118 for the advancing screw section 119 which is fixed on the shaft 95. Tapering sections 112a and 116a are provided on the end walls 112 and 116. The barrel section 114 which connects with the barrel section 118 includes an end wall 120, and the barrel section 118 includes an end wall 121, as shown, which define the mid-portion of the Z-shaped transfer vessel 94. In this mid-portion a pair of interengaging screw members 122 and 123 which are essentially extensions of the screw sections 119 and 115, respectively, are provided on the shafts 95 and 96, respectively, and it will be noted that each of the screw sections 115, 123, 122, and 119 are pitched to advance the material in the direction of the arrows d. Because the material is conveyed in a Z-shaped path through the transfer vessel 94 and moved transversely by the substantially interengaging screw sections 123 and 122, bearing blocks 124 and 125 can be provided on the barrel sections 114 and 118, respectively, which include bearings 126 and 127 for journaling the shafts 95 and 96, respectively. As shown in FIGURE 9, a jacket 128 may be provided for the barrel 114 and a jacket 129 for the barrel 118 to permit the circulation of heating or cooling medium. Packing cups 130 are shown provided on the walls 112 and 121 and on the walls 116 and 120 to accommodate gland members 131 and gland retainers 132 for sealing the shafts 95 and 96 against the escape of materials being mixed. Bolts 133 may be employed to secure the transfer vessel 94 to the vessels 92 and 93.

Figure 10:
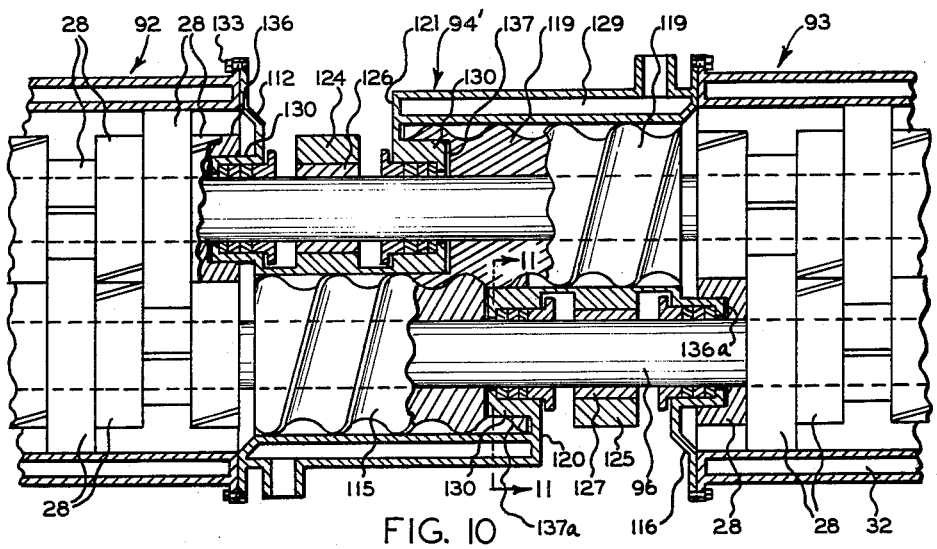
FIGURE 10 is a similar view illustrating a modified form of the embodiment depicted in FIGURE 9.
Figure 11:
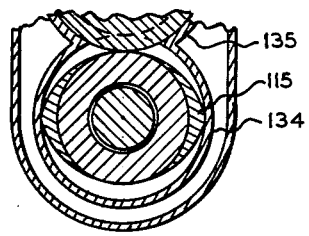
FIGURE 11 is a sectional, transverse elevational view taken on the line 11—11 of FIGURE 10.

The embodiment of the invention shown in FIGURE 10 is very similar to the embodiment of the invention depicted in FIGURES 7–9 and like numerals have been used to designate similar parts. As shown in FIGURE 11, the chamber walls 134 and 135 defining the chambers for the partially intermeshing screw sections 115 and 119 comprise a pair of intersecting, cylindrical sections and each of the screw sections 115 and 119 has the configuration illustrated in FIGURE 11. Principally, the transfer vessel 94' shown in FIGURE 10 differs in that the packing cups 130 are inset, rather than projecting, and the transfer vessel 94' can thus be more compact in nature than the transfer vessel 94. Also, the sections 115 and 119 are brought into intermeshing relation and extensions 122 and 123 are not provided. In FIGURE 10 the gland cup 130 mounted on the wall 112 extends into a bored opening 136 provided in the end paddle member 28 on the shaft 95 in vessel 92 and similarly the gland cup 130 on the wall 116 is partly received in a bored opening 136a provided in the foremost paddle 28 mounted on the shaft 96 within the vessel 93. The gland cup 130 on wall 121 is received within a bored opening 137 provided within the screw member 119 and similarly the gland cup 130 for the wall 121 is received within a bored opening 137a provided in the screw member 115. In fact, it will be noted that the bored openings 136a and 137a interrupt the threads on the screw sections 119 and 115, respectively.

In FIGURES 12–16 a form of the invention shown in FIGURES 7–9 is illustrated which is the same as that shown in FIGURES 7–9 except for the particular paddles which are used at intervals in the vessels 92 and 93 to substitute for mating paddles 28. The construction of the vessels and the substantially interengaging paddles on the shafts 95 and 96 remains essentially the same. However, at intervals on the shafts 95 and 96, as for instance at the zones 138 in vessel 92 and 139 in vessel 93, positive displacement paddles of the type illustrated in FIGURES 13–16 are employed. Each set of such paddles includes a paddle member 140 on the shaft 95 in substantially interengaging relation with a paddle member 141 (see FIGURE 15) on the shaft 96. These paddles preferably are forwardly pitched, as are paddles 28, to aid in advancing the material but this is not shown in FIGURE 14. The paddle member 141 is provided with a front baffle 142 and a rear baffle 143. The shape of the members 140 and 141 is such that they continuously wipe one another and also wipe the interior walls of the chamber in which they revolve as they are rotated in the same direction and at the same speed. The baffle 142 leads the baffle 143 in the sense that it is displaced from it 180° in the direction of rotation of the shaft 96. The coaction of the novel paddle members 140 and 141 with the associated baffles 142 and 143 is to provide essentially a positive displacement pump which tends to prevent back flow of material. The construction is especially suited to materials of the type mentioned previously which must have a carefully controlled reaction time for a particular chemical reaction which is to be achieved, for instance. Such reacting materials must all proceed through the mixing apparatus in substantially the same time and one portion thereof must be about as thoroughly mixed as another portion and as thoroughly reacted. The manner in which the paddles 140 and 141 coact is particularly demonstrated in FIGURE 16, which shows the eight positions in which, from the top of FIGURE 16 downwardly, the paddles are successively incrementally advanced 45° in the direction of rotation of the paddles. As the paddles move around, the rear baffle member 143 is continually blocking the rearward passage of material and the front baffle member 142 is continually open in the sense that material is advanced past it.

Figure 17:
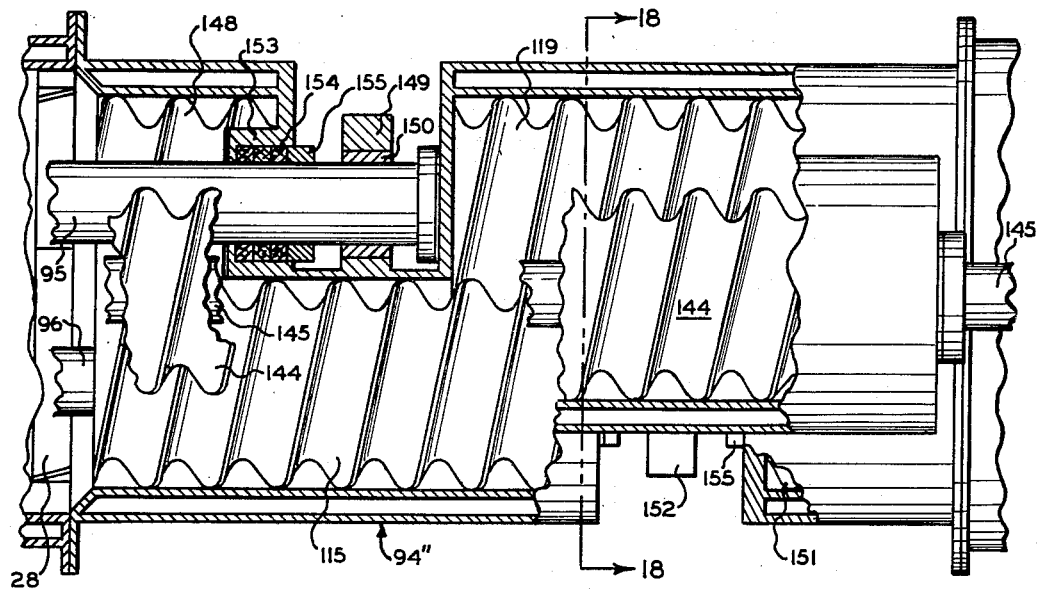
FIGURE 17 is a sectional, top plan view illustrating another form of transfer section for connecting axially aligned mixing vessels.
Figure 18:
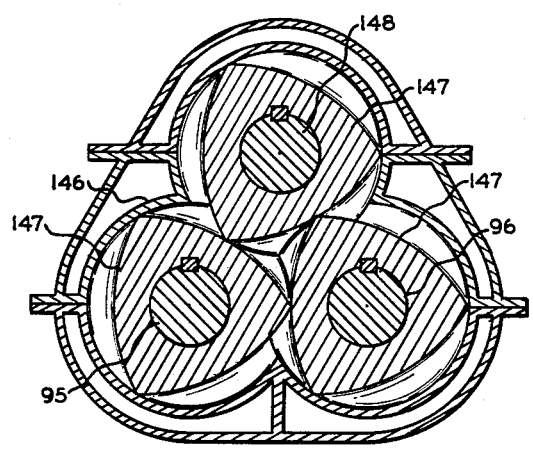
FIGURE 18 is a sectional, transverse elevational view taken on the line 18—18 of FIGURE 17.

In FIGURES 17 and 18 another embodiment of the invention is shown which is similar to the embodiment shown in FIGURES 10 and 11 except that the screw sections 115 and 119 are made self-cleaning by the addition of a third screw section 144 mounted on a shaft 145 which can be driven in any convenient manner in the same direction of rotation and at the same speed as the screw sections 115 and 119. For instance, one method of driving the shaft 145 would be to extend it lengthwise so that it projected beyond the front end of vessel 92 and into meshed engagement with a driving gear in the manner of the next embodiment of the invention to be described (FIGURE 19).

As shown in FIGURE 18, the wall defining the mixing chamber of the transfer section 94'' for the three screw sections 115, 119 and 144 is substantially cloverleaf in shape, as at 146, and correspondingly the paddles 147 are generally triangularly shaped and helically pitched, as shown. In this embodiment of the invention the screw section 148 is mounted on the shaft 95, and the section 119 is, in effect, a continuation thereof, which is interrupted by a bearing block 149 mounting a bearing 150 which supports the shaft 95. The screw 151 is also, in effect, an extension of screw 115 which is interrupted to provide a space for a bearing block 152 for journaling the shaft 96. Packing cups 153 for the shafts 95 and 96 are similarly inset, as shown, in the screw sections 148 and 151 and the gland members 154 and retainers 155 are provided as previously.

In practice, throughout the length of the transfer section 94'' the screw sections 148, 115, 119, 144, and 151 are triangular in shape, as shown in FIGURE 18, and of course, as throughout the constructions disclosed herein, the chamber in which the paddles rotate is always shaped so that every part of the walls thereof are wiped by the paddle members. With the construction shown in FIGURES 17 and 18, there never is any danger of material clogging in the transfer section since, by virtue of the inclusion of screw section 144, the transfer vessel 94'' is rendered self-cleaning.

In FIGURES 19–21 I have shown a final embodiment of the invention in which the transfer vessel 94''' is disposed generally under the mixing vessels 92 and 93. In this embodiment of the invention the shafts 95 and 96 are supported at their ends in bearing blocks 156 and 157 mounted on a base 158. With the arrangement disclosed, bearings 159 on the transfer vessel 94''' may be employed to support the shafts 95 and 96 intermediate their ends. The shafts 95 and 96 similarly mount paddle members 28 in the same manner and, as shown in FIGURE 1, the members 28 are in substantially interengaging relation with members 28 on the shafts 159 and 160 which extend through the transfer vessel 94'''. Bearings 161 and 162 depending from the vessels 92 and 93, respectively, support the shafts 159 and 160 and it will be seen that the shafts 159 and 160 at their front ends are also supported by the front bearing block 156. A drive gear 163 mounted on a drive shaft 164 which extends from a gear box 165 which is connected to a suitable electric motor meshes with the gears 166 on shaft 95, 167 on shaft 96, 168 on shaft 159, and 169 on shaft 160. Material supplied through the charge opening 170 being processed by the agitating paddles 28 on the shafts 95 and 96 proceeds to the end of vessel 92 and is moved downwardly into the transfer vessel 94, whence the paddles 28 on the shafts 159 and 160 move it forwardly. While it is not so indicated in FIGURE 21, the paddles 28 on the shafts 159 and 160 are also successively helically arranged and are pitched so that their effect is to move the material forwardly. At the front end of transfer vessel 94''', the material is moved upwardly into the vessel 93 and thence is conveyed by the paddles 28 on shafts 95 and 96 within vessel 93 forwardly to the discharge openings 171. It will be seen that the vessel 94 has side-by-side, intersecting, cylindrical casing walls 172 and 173 vertically intersecting the chamber walls 30 and 31 of the vessels 92 and 93, which are open along their bottoms at the opposing ends of vessels 92 and 93 to permit this. The material is continuously moved in the direction of the arrows e and it should be clear that the transfer section 94''' is self-cleaning since the paddles 28 on shafts 95 and 96 within both vessels 92 and 93 are in substantially interengaging relation with the paddles 28 on shafts 159 and 160. The latter paddles, of course, completely wipe the mixing chamber walls of the transfer section 94''' which intermediate its ends opposite bearing 159 takes the shape of two horizontally intersecting cylinders in the manner of the vessels 92 and 93.

It should be apparent that we have perfected continuous mixing apparatus including transfer vessels for various materials and reactions which transfer the material between mixing vessels without interrupting the agitation of the material.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

I claim:

1. In a continuous mixer; first casing means forming a mixing compartment; means for feeding the material to be mixed into said first casing means; at least a pair of mixer shaft portions extending axially in said casing means; a grouping of cooperating mixer members on said shaft portions and arranged to propel material in said compartment in an axial direction away from said means for feeding the material into said casing means; a second casing means forming an additional mixing compartment; at least a pair of second mixer shaft portions extending axially in said second casing means; a grouping of cooperating mixer members on said latter shaft portions; means for discharging mixed material from said second casing means; transfer casing means connecting said first and second casing means including a portion extending generally transversely to said first casing means; shaft means extending axially in said transfer casing means; and transfer mixer means thereon transporting material from said first casing means to said second casing means while mixing it and causing said material in at least part of its travel through said transfer casing means to move transversely to its axial movement in said first casing means.

2. In a continuous mixer; a first axially extending casing section, said casing section having a material receiving opening in one end thereof and a discharge opening at the other end thereof; a pair of axially extending first shaft sections extending substantially from end to end thereof; substantially interengaging mixer members on said first shaft sections for moving material from said one end of said casing section toward said other end thereof; bearings for supporting said first shaft sections at said one end thereof; a second axially extending casing section; said second casing having a material receiving opening at one end thereof and a discharge opening at the other end thereof; a pair of axially extending second shaft sections extending substantially from end to end of said second casing section; substantially interengaging mixer members on said second shaft sections; bearings for said second shaft sections of the second casing section at said other end thereof; a transfer casing section connecting said discharge opening of said first casing section and the receiving opening of said second casing section; axially extending shaft section means in said transfer casing section; bearing means near said transfer casing section supporting said first and second shaft sections; and mixer member means on said shaft section means receiving material from said mixer members on said first shaft sections and passing it to said mixer members on said second shaft sections.

3. The combination defined in claim 2 in which said mixer member means on said shaft section means comprises transfer means disposed between said substantially interengaging mixer members on the first and second shaft sections in wiping relationship with said mixer members.

4. The combination defined in claim 3 in which said first and second shaft sections and shaft section means are driven in the same direction of rotation and at the same speed.

5. The combination defined in claim 3 in which said first and second shaft sections on the ends thereof adjacent said transfer casing section have substantially interengaging screw members thereon pitched to return material toward the substantially interengaging mixer members thereon and said shaft in the transfer casing section has a similar screw member substantially interengaging with screw members on said first and second shaft sections.

6. The combination defined in claim 3 in which said transfer casing section mounts a second shaft section means parallel with the first shaft section means therein; rotor means is mounted on said second shaft section means for substantially interengaging travel with said mixer member means thereon; and means for revolving said rotor means at a greater rate of speed than the mixer member means on said first shaft section means in the transfer casing and in the opposite direction.

7. The combination defined in claim 2 in which said first casing section and second casing section are in side-by-side relation and said transfer casing section extends transversely between them to connect them at one end.

8. The combination defined in claim 2 in which said first and second casing sections are axially aligned; and said transfer casing section is generally Z-shaped and extends axially between them; said transfer casing section including: a pair of shaft sections connecting said first and second shaft sections, a bearing for each connecting shaft section, and substantially interengaging mixer members in the mid-portion of said Z-shaped transfer casing section between said bearings for each of the connecting shaft sections.

9. The combination defined in claim 8 in which said substantially interengaging members in the transfer casing are screw members and each is bored out to receive stuffing box means.

10. The combination defined in claim 2 in which substantially interengaging mixer members on said first and second shaft sections comprise wiping core sections with baffles thereon arranged to provide a positive displacement pumping action.

11. The combination defined in claim 2 in which said first and second casing sections are generally axially disposed; and said transfer casing section includes: a pair of shaft sections connecting said first and second shaft sections and bearing means for each of said pair of shaft sections, a third shaft section parallelly mounted in said transfer casing section with said pair of shaft sections; and substantially interengaging mixing members on said pair of shaft sections and third shaft section.

12. The combination defined in claim 2 in which said first and second shaft sections and shaft section means in the transfer casing section comprise a pair of continuous shafts extending through said first casing section, said transfer casing section, and said second casing section.

13. The combination defined in claim 2 in which said first and second shaft sections and said shaft section means comprise a first pair of continuous shafts; said first and second casing sections are axially aligned; and said transfer casing mounts a second pair of parallel shafts parallel to said pair of shafts; and substantially interengaging mixer members on said second pair of shafts mounted also in substantially interengaging relation with the substantially interengaging mixer members on said first pair of shafts.

14. In a continuous mixer; first casing means forming a mixing compartment having a discharge opening therein; mixer shaft means extending axially in said first casing means; mixer element means on said mixer shaft means; a second casing means providing an additional mixing compartment having inlet and discharge openings therein; second mixer shaft means extending axially in said second casing; mixer element means on said latter shaft means; means for feeding the material to be mixed in an axial direction through said first casing means toward its discharge opening; means for discharging mixed material from said second casing means through its said discharge opening; transfer casing means connecting the discharge opening of said first casing means and the inlet opening of said second casing means including a portion extending generally transversely to said first casing means; shaft means extending axially in said transfer casing means; and transfer mixer means thereon transporting material from said first casing to said second casing while mixing it and causing said material in at least part of its travel through said transfer section to move transversely to its axial movement in said first casing means.

15. In a continuous mixer; a first axially extending casing section, said casing section having a material receiving opening near one end thereof; axially extending first shaft means extending from end to end thereof; mixer element means on said first shaft means; bearing means for supporting said first shaft means at said one end thereof; a second axially extending casing section; said second casing having a material discharge opening near one end thereof; axially extending second shaft means extending from end to end of said second casing section; mixer element means on said second shaft means; bearing means for said second shaft means of the second casing section at said one end thereof; a transfer casing section connecting said first and second casing sections; axially extending shaft section means in said transfer casing section; bearing means, near said transfer casing section supporting said first and second shaft means; and mixer means on said shaft section means receiving material from said mixer element means on said first shaft means and passing it to said mixer element means on said second shaft means.

16. In mixing apparatus; a housing having a front end and a rear end and including parallel intersecting partly cylindrical sections, means for introducing material to be mixed near the rear end of said housing, a shaft extending axially through each of said sections, said housing having a discharge opening near its front end, a plurality of pairs of substantially interengaging paddles provided on said shafts for rotation therewith, means for rotating said shafts in the same direction, at least one pair of said paddles having one of its paddles provided with angularly offset front and rear baffles with the front baffle angularly leading the rear baffle in the direction of rotation of said shafts, the substantially interengaging paddles being shaped and disposed so as to wipe one another and the housing as they rotate.

17. The combination defined in claim 16 in which said pair of paddles having one of its paddles provided with front and rear baffles are disposed at intervals in said housing.

18. The combination defined in claim 16 in which said front baffle leads the rear baffle by substantially 180 degrees.

19. In a continuous mixer; a first axially extending casing section including parallel intersecting partly cylindrical wall sections, said casing section having a material receiving opening; at least a pair of axially extending first shaft means extending axially in said first casing section; substantially radially interengaging mixer element means provided on said first shaft means; a second axially extending casing section including parallel intersecting partly cylindrical sections; said second casing having a material discharge opening therein; at least a pair of second shaft means extending axially in said second casing section; substantially radially interengaging mixer element means provided on said second shaft means; said mixer element means in said first and second casing sections being shaped to wipe one another and the casing section wall sections; a transfer casing section connecting said first and second casing sections; shaft section means in said transfer casing section; and mixer means provided on said shaft section means receiving material from said mixer element means on said first shaft means and passing it to said mixer element means on said second shaft means; said mixer means on said shaft section means being shaped to wipe mixer element means on the first and second shaft means.

20. In a continuous mixer; a first axially extending casing section, said casing section having a material receiving opening; axially extending first shaft means extending substantially from end to end thereof; mixer element means provided on said first shaft means; a second axially extending casing section, said second casing having a material discharge opening; axially extending second shaft means extending substantially from end to end of said second casing section; mixer element means provided on said second shaft means; a transfer casing section connecting said first and second casing sections; shaft section means extending in a plane parallel to said first and second shaft means in said transfer casing section; and mixer means provided on said shaft section means receiving material from said mixer element means on said first shaft means and passing it to said mixer element means on said second shaft means; at least one of said first and second casing sections including parallel intersecting partly cylindrical wall sections, the mixer shaft means therein comprising at least a pair of shafts; and the mixer element means on said shafts being substantially radially interengaging and shaped to wipe one another and the said wall sections.

References Cited by the Examiner

UNITED STATES PATENTS

| | | | |
|---|---|---|---|
| 1,433,865 | 10/22 | Wolf | 259—97 |
| 2,670,188 | 2/54 | Erdmenger | 259—6 |
| 2,868,517 | 1/59 | Lasch | 259—64 |
| 3,133,727 | 5/64 | Luscombe | 259—97 |

WALTER A. SCHEEL, *Primary Examiner.*

CHARLES A. WILLUMUTH, *Examiner.*